United States Patent Office 3,467,626
Patented Sept. 16, 1969

3,467,626
PROCESS FOR PREPARING A HIGHLY ELASTIC LINEAR POLYMER AND AN ELASTIC ARTICLE PRODUCED THEREFROM FROM ISOCYANATE TERMINATED PREPOLYMERS REACTED WITH AN AMINOHYDRAZIDE
Eiichi Negishi, Akihiro Horike, and Yoshio Ishizuka, Tokyo, Japan, assignors to Teijin Limited, Osaka, Japan, a corporation of Japan
No Drawing. Filed Oct. 28, 1965, Ser. No. 505,466
Claims priority, application Japan, Nov. 2, 1964, 39/62,198
Int. Cl. C08g 22/04
U.S. Cl. 260—75
9 Claims

ABSTRACT OF THE DISCLOSURE

A process for preparing highly elastic linear polymers and an elastic article produced therefrom, such process comprising reacting in an inert solvent a linear prepolymer of a molecular weight of at least 700 having isocyanate groups at its ends with an aminohydrazide of a molecular weight of not more than 140 and having as one of its end groups a primary amino group and as its other a —CONHNH$_2$ group.

---

This invention relates to a process for preparing highly elastic linear polymer and to articles, particularly fiber, yarn and film, obtained therefrom; the process being featured in that (1) it has overcome very readily, and without the necessity of any additional operations, the technical defects attending the polymerization operation in the prior art processes whose solution had been difficult; (2) the storage stability of the resulting polymer solution is excellent; and (3) articles are provided by the aforesaid elastic polymer, such as fiber, yarn and film, whose properties show a great improvement over those of the articles obtained by the prior art processes.

More particularly, the present invention relates to a process for preparing highly elastic linear polymer and articles obtained therefrom, which is characterized in that at least one linear prepolymer having isocyanate groups at its both ends and a molecular weight of at least 700, and preferably at least 1000, is reacted in an inert solvent with an aminohydrazide of a molecular weight of not more than 140, and preferably not more than 115, having as one of its two end groups a primary amino group and as the other a —CONHNH$_2$ group.

It has been known to prepare highly elastic linear polymer by reacting a linear prepolymer having isocyanate groups at its both ends with a diamine or a dihydrazide. It is also known to prepare an elastic polymer by reacting hydrazine hydrate with such a prepolymer.

Of these prior art techniques, the one in which the reaction was with a diamine had the defect that gel was apt to form since the reaction between the isocyanate groups of the aforesaid linear prepolymer and the diamine was very violent. In addition, the control of the reaction so as to obtain the desired elastic linear polymer frequently becomes very difficult.

Further, in the prior art process wherein the reaction is carried out with a dihydrazide, the reaction is carried out in a solvent which is essentially inert to the isocyanate groups of the aforesaid linear prepolymer, but since the dihydrazides are difficult to dissolve in such a reaction medium when cold, the dihydrazide must be dissolved in said inert solvent by heating and added to the reaction system at a temperature higher than the precipitation temperature of said dihydrazide. In consequence, the temperature of the reaction system inevitably becomes high, and the control of the reaction becomes usually difficult despite the fact that the reactivity of the dihydrazides to isocyanate is milder than that of the diamines.

On the other hand, if it is intended to avoid such a disadvantage, the temperature at which the addition is made must be lowered. Now, in the case the temperature of addition is too low, the deposited dihydrazide is left undissolved in the elastic polymer solution. As a result, the degree of polymerization cannot be fully raised, and hence a satisfactory elastic polymer solution cannot be obtained.

Further, of these prior art processes, in the one where the reaction is carried out with hydrazine hydrate, the storage stability of the resulting elastic polymer solution is rather poor such that there is a tendency to discoloration of the solution in a relatively short period of usually about a day. Consequently, not only is the quality of the elastic articles obtained degraded, but also there is involved the commercial disadvantage that the stock elastic polymer solution cannot be stored stably. As this tendency to discoloration proceeds considerably rapidly, it frequently becomes a fatal defect in the production of such articles as fiber, yarn and film whose discoloration is not desirable.

It is also proposed to react with a linear prepolymer having isocyanate groups at its both ends a component capable of bonding therewith and then reacting the resulting product with another component to obtain a complex multicomponent elastic polymer, but such a reaction naturally becomes complicated from the standpoints of the processing steps and operations involved. Thus, although it can be utilized for the purpose of obtaining elastic polymers suitable for special use, it merely complicates the operations and processing steps in the case of those elastic polymers not requiring the special properties that are required by such use.

As a result of having engaged in researches aiming to overcome satisfactorily the aforementioned disadvantages and to provide a process for the preparation of highly elastic linear polymer whose properties have also been improved, we found that by merely utilizing with the linear prepolymer having isocyanate groups at its both ends, an aminohydrazide of a molecular weight of not more than 140, and preferably not more than 115, having as one of its two end groups a primary amino group and as the other a —CONHNH$_2$ group, the disadvantages from the standpoint of the polymerization operation and steps, as hereinbefore noted, can be overcome to advantage and the storage stability of the resulting elastic polymer solution was excellent such that no observable discoloration appeared even though it was stored for, say, one month, and thus that a process for the preparation of the aforesaid elastic polymer having these advantages could be readily provided without the necessity whatsoever for any additional steps or operations.

We also found that the properties of the articles made from the resulting elastic polymer could be improved.

It is therefore an object of the present invention to provide a commercially advantageous process for preparing highly elastic linear polymer from which can be obtained fiber, yarn, film and coating having improved properties.

Another object of this invention is to provide articles such as fiber, yarn, film and coating and, in particular, fiber and yarn (hereinafter referred to as fiber). Other objects and advantages of the invention will become apparent from the following description.

The foregoing objects of the present invention are achieved by reacting in an inert solvent at least one linear prepolymer having isocyanate groups at its both ends and of a molecular weight of at least 700, and preferably at least 1000, with an aminohydrazide of a molecular weight of not more than 140, and preferably not more than 115, having as one of its two end groups a primary amino group and as the other a —CONHNH$_2$ group.

The aminohydrazides which are used in the invention process generally have great solubility in such polar solvents that are essentially inert to the isocyanate group, for example, N,N-dimethylformamide, and hence they not only dissolve readily at room temperature but also do not precipitate even at low temperatures.

The dihydrazides which were used in the prior art processes in most cases had to be heated to above 100° C. for obtaining a 2% solution by dissolving in N,N-dimethylformamide. Furthermore, it was generally difficult to maintain the solution state at below 50° C. without the occurrence of objectionable precipitation.

The aminohydrazides such as aminoacetic acid hydrazide and β-aminopropionic acid hydrazide, as used in the invention process, can however be very readily made into a 2% solution at room temperature. Further, since the amino group at one end has high reactivity whereas that of the —CONHNH$_2$ group at the other end is relatively low, the isocyanate groups are first reacted chiefly with the amino group to disperse the aminohydrazides uniformly throughout the reaction system, and then the remaining isocyanate groups are reacted chiefly with the

—CONHNH$_2$ group at a desirable speed. Thus, the preparation of the polymer can be carried out smoothly in a single step without the attendance of gel formation.

It is a very difficult matter to carry out the polymerization reaction smoothly in this manner when using diamines having at their both ends amino groups whose reactivity is high as well as when using dihydrazides whose solubility is very low. As previously noted, this was a technical defect whose solution was very difficult in the prior art processes.

hydrazide are not suitable, because the intermediate esters required for their synthesis are difficult to synthesize owing to the strong tendency to cyclization. Furthermore, when the molecular weight of the aminohydrazide exceeds 140, the elastic properties of the resulting polymer decline abruptly and hence are undesirable. Preferably the molecular weight is not more than 115 and in general one whose molecular weight is more than about 90 is used. Of the aforementioned aminohydrazides, particularly to be preferred are aminoacetic acid hydrazide and β-aminopropionic acid hydrazide. When these are used as the chain-extender, not only are the previously noted defects overcome as compared with the instance wherein diamines are used as in the prior art processes, but also improvements are had with respect to the properties in that the elastic article obtained excels in the various properties at elevated temperatures (at and above 140° C.), and particularly in its elastic property. In additon, its weatherability is also improved. These improved properties become a great advantage when the elastic fiber obtained by the invention process is to be used conjointly with the polyester fibers which require a high temperature during their dyeing and post-treatment operations.

Further, when the invention process which uses aminohydrazides is compared with the prior art process in which a linear prepolymer having isocyanate groups at its both ends is polymerized with hydrazine hydrate, the former excels the latter with respect to the storage stability of the polymer solution, which the latter lacks, as well as with respect to the properties at elevated temperatures of the resulting elastic polymer.

In Table I are shown the degrees of yellow coloring of 20% solutions obtained by reacting a prepolymer, obtained from poly(tetramethylene oxide) glycol of a molecular weight of 2000 and methylenebis (4-phenylisocyanate) stabilized with an antioxidant, with hydrazine hydrate and β-aminopropionic acid hydrazide, separately, when a colorimetric test was conducted, the coloring being indicated by the concentration of the corresponding aqueous solution of the dilute sodium chromate.

TABLE I

| | Hydrazine hydrate (comparison) | β-Aminopropionic acid hydrazide |
|---|---|---|
| Immediately after polymerization | <0.001% | <0.001% |
| 1 day after | 0.003% | <0.001% |
| 3 days after | 0.02% | <0.001% |
| 7 days after | 0.01% | <0.001% |

Further, the elastic polymer obtained by the heretofore-proposed process, i.e. that of the aforesaid comparison, and the elastic polymer obtained in accordance with the invention process using β-aminopropionic acid hydrazide were both spun under same conditions to yield fibers. Some of the properties at elevated temperatures of the above-obtained fibers are given in the following Table II.

TABLE II.—PROPERTIES AT ELEVATED TEMPERATURES

| | 100% Modulus (140° C.), g./de. | 200% Modulus (140° C.), g./de. | Modulus After relaxation (140° C., 200%, 1 min.), g./de. | Modulus at Recovery (140° C.), 100%, g./de. | Stress relaxation (140° C., 200%, 1 min.), Percent | Tensile recovery (140° C., 200%, 1 min.), Percent | Decomposition Point by Differential Thermal Analysis, ° C. | Coloring Temperature, ° C. |
|---|---|---|---|---|---|---|---|---|
| β-Aminopropionic acid hydrazide | 0.060 | 0.093 | 0.063 | 0.021 | 32.3 | 84.0 | 220–236 | 220 |
| Hydrazine hydrate | 0.059 | 0.077 | 0.047 | 0.014 | 39.0 | 73.0 | 200–222 | 210 |

Next, a more specific description will be given of the aminohydrazides, as used in the invention process, the end groups at one end of which is a primary amino group and the other end of which is a —CONHNH$_2$ group.

The aminohydrazides which are suitably used in the invention process include aminoacetic acid hydrazide, α-aminopropionic acid hydrazide and β-aminopropionic acid hydrazide.

γ-Aminobutyric acid hydrazide and δ-aminovaleric acid

Even when compared with the prior art process which uses hydrazine hydrate not only can it be seen that according to the present invention there is a marked improvement in the storage stability of the elastic polymer solution, which was the defect of the prior art process but also an appreciable improvement over the prior art process is seen with respect to the properties of the fiber made from the resulting elastic polymer.

Further, in comparison with the instance of the use of dihydrazides inclusive of carbohydrazide, the previously mentioned defect during polymerization is overcome to advantage. And while the properties that are desired in an elastic polymer for making it of practical use include those on the order of a tensile recovery (200%, 1 min., room temperature) of at least 94%, a tensile recovery in water (100%, 10 min., 90° C.) of at least 70%, a stress relaxation (200%, 1 min., room temperature) of not more than 35% and a modulus at recovery (at a 100% elongation after a 200% elongation, room temperature) of at least 0.022 g./de., it is only when carbohydrazide is used as the dihydrazide that these property values can be barely satisfied. However, in the case of an elastic article made from carbohydrazide, there is a definite tendency to its coloration to pink even when utmost care has been exercised in its synthesis. Thus its value as a merchandise is greatly impaired. Again, even with respect to the foregoing properties, the elastic polymer obtained according to the invention process manifests an improvement over the instance where carbohydrazide has been used.

Next, the linear prepolymer having isocyanate groups at its both ends, which is used in this invention, will be described more fully.

According to the invention process, preferably used is a linear prepolymer obtained by the reaction between a linear high molecular weight substance having at its both ends the same or different end groups having active hydrogen determinable by the Zerewitinoff reaction, and a diisocyanate in an excessive molar quantity of at least 1 mol, and usually ca. 2 mols.

The end group having such active hydrogen include such as the hydroxyl, primary or secondary amino, amido, imido, sulfonamide, hydrazide, carboxyl, urea, urethane, hydrazone and oxime groups. Particularly preferred are the hydroxyl, primary or secondary amino and hydrazide groups.

As the linear high molecular weight substances having as such end groups, both of which are the same, especially useful are the polyglycols, polydiamines and polydihydrazides. On the other hand, as those having different reactive groups at their ends, useful are the polyaminoalcohols, polyhydroxyhydrazides and polyaminohydrazides.

As to the portion that is included between the hereinabove indicated reactive groups at the two ends, there is no particular limitation except the choice should be made from high molecular weight substances whose second order transition or softening points are below room temperature.

As is well-known, the aforesaid polyglycols include the poly(alkyleneoxide) glycols, polyester glycols, polyurethane glycols, polycarbonate glycols and polyacetal glycols.

The aforesaid polydiamines include the polyaminodiamines and polyurethane diamines.

On the other hand, the polydihydrazides can be obtained, for example, either by subjecting polyglycols to the action of phosgene to convert the ends to a chloroformate group and thereafter reacting this with an excess of hydrazine, or by reacting hydrazine with polyesters or polyamides having an acid chloride at the ends or polyamidoesters having an ester group at the ends. In synthesizing these polydihydrazides, when those in which a hydroxyl group or an amino group remains at one end or in part or those in which these groups have been deliberately caused to remain are reacted with hydrazine, polyhydroxyhydrazines and polyaminohydrazides, or mixtures of these with polyglycols, polydiamines and polydihydrazides are obtained.

The hereinbefore described polyglycols, polydiamines, polydihydrazides, polyamino alcohols, polyhydroxyhydrazides and polyaminohydrazides have in all cases been obtained using as their starting material one or more of either the glycols, diamines, dicarboxylic acids and the derivatives thereof. In some cases, other substances such as, for example, phosgene and hydrazine have also been used.

These glycols, diamines, dicarboxylic acids and the derivatives thereof will be described further.

As such glycols, included are poly (alkyleneoxide) glycols such as poly (ethyleneoxide) glycol, poly (propyleneoxide) glycol, poly (tetramethyleneoxide) glycol and poly (hexamethyleneoxide) glycol, and the mixtures or copolymers thereof; lower polymethylene glycols such as ethyleneglycol, trimethyleneglycol, tetramethyleneglycol, hexamethyleneglycol and decamethyleneglycol; and polymethyleneglycols having substituent groups such as 1,2-propyleneglycol, 1,2-butyleneglycol and neopentylglycol.

On the other hand, the aforesaid diamines include polymethylenediamines such ethylenediamine, trimethylenediamine, hexamethylenediamine and nonamethylenediamine; polymethylenediamines having substituent groups such as 3-methylhexamethylenediamine; N-substituted or N,N'-disubstituted diamines such as N-ethyltetramethylenediamine and N,N'-dibutylhexamethylenediamine, or the mixture thereof.

Further, as the aforesaid dicarboxylic acids and the acid chloride and ester derivatives thereof, the aliphatic dicarboxylic acids such as oxalic, succinic, adipic, azelaic, sebacic and 3-methyl adipic acids and the derivatives thereof are conveniently used.

The linear high molecular weight substances which are used to prepare the linear prepolymer in the present invention are preferably those having a molecular weight of 500–4000, and particularly 800–3000. Further, the polyglycols, and particularly the poly (alkyleneoxide) glycols and polyester glycols, are preferable.

As the suitable diisocyanates for reacting with the above-described linear high molecular weight substances, included are 2,4-toluylene diisocyanate, 2,6-toluylene diisocyanate, m-phenylene diisocyanate, p-phenylene diisocyanate, 4,4'-biphenylene diisocyanate, 1,5-naphthylene diisocyanate, methylenebis (4-phenylisocyanate), 1,4-tetramethylene diisocyanate and 1,4-cyclohexane diisocyanate, which may be used singly or as a mixture of two or more thereof. Especially preferred are the aromatic diisocyanates of high symmetry such as p-phenylene diisocyanate, methylenebis (4-phenylisocyanate) and 4,4'-biphenylene diisocyanate.

As previously indicated, according to the invention process, the linear high molecular weight substance and the diisocyanate are reacted with a molar excess of the latter to the former, i.e., at least 1 mol, and usually about 2 mols, of the latter to 1 mol of the former.

When, in this case, more than 2 mols of the diisocyanate are used, the reaction that takes place is one wherein a mixture of linear prepolymer having isocyanate groups at its both ends and free monomeric diisocyanate reacts with aminohydrazides.

In order that the finally resulting highly elastic linear polymer will exhibit a good elasticity, the molecular weight of the linear prepolymer having isocyanate groups at its two ends must be at least 700, and preferably at least 1000. Usually one up to about 5000 is used. The reason therefor is that when the molecular weight is less than 700, the elastic recovery of the elastic polymer is poor.

In reacting according to the invention process the prepolymer having isocyanate groups at its both ends with the aminohydrazide, which is used as a chain-extender, it is convenient to dissolve the two components in a suitable solvent in advance. The solvent used in this case is preferably one which is capable of also dissolving the finally formed elastic polymer. Suitable solvents include N,N-dimethylformamide, N,N-dimethylacetamide, tetramethylurea, dimethylsulfoxide and hexamethylphosphoramide. Although there are some among the foregoing solvents that are known to react gradually with the isocyanate group, in the case of the invention process these can be used, considering them as being virtually inert to the reaction components. Therefore, the term "inert solvent," as used herein, includes the instance such as noted above and is a terminology of a solvent which dissolves the linear prepolymer and the aminohydrazide compounds, but is essentially inert thereto.

According to the invention process, reaction accelerators or inhibitors may also be used. It is also permissible to add a viscosity adjusting agent to the reaction system during, or before or after, the polymerization reaction for obtaining an elastic polymer solution which is stable and of good reproducibility. As the viscosity adjusting agent included are primary and secondary amines such as isobutylamine, diethylamine and dibutylamine; monohydrazides such as acetic acid hydrazide and propionic acid hydrazide; and monoisocyanates such as phenyl isocyanate.

Further, the addition to the resulting highly elastic linear polymer solution of delustrants such as titanium oxide, zinc sulfide and antimony oxide, various pigments or dyestuffs, or protective agents such as 2,6-di-t-butyl-4-methylphenol, benzotriazol derivatives, as well as other additives makes the resulting shaped articles of the elastic polymer still more useful.

The reaction in accordance with the invention process between a linear prepolymer having isocyanate groups at its both ends, obtained by reacting a diisocyanate with a linear high molecular weight substance, and an aminohydrazide whose one end is a primary amino group and the other end is a —CONHNH$_2$ group is usually carried out at a temperature of the order of 0–40° C.

Customary procedures can be used in making shaped articles from the elastic polymer solution prepared by the invention process. For example, in the case of a fiber, it is obtained by the customary methods of wet or dry spinning. In the case of wet spinning, usually either methanol, ethanol, water or a mixture of these adjusted to a suitable temperature is used, On the other hand, in the case of dry spinning, the polymer solution, after having been heated in advance, is extruded into hot air to evaporate the solvent and form the fiber. The elastic fiber obtained by these methods can be obtained as mono- or multifilaments of much finer denier as compared with the conventional rubber yarn. Further, by extruding the polymer solution into a film, or by stretching it into a film by other means, or by coating a substrate surface with the polymer solution and thereafter evaporating the solution or dipping the substrate in a hardening bath, films or the like can be formed. These shaped articles posses a high degree of tensile strength and modulus as well as great elongation and excellent elasticity. The various property values, particularly recovery under heat, shrinkage in boiling water and heat-settability, of the various shaped articles, as obtained hereinabove, can be improved by imparting such after-treatments as a wet heat or dry heat treatment under tension or in the absence thereof.

In order that a better understanding of the invention will be had, the following nonlimitative examples are given. The parts in the examples are on a weight basis unless otherwise indicated.

EXAMPLE 1

To melted 3.74 parts of methylenebis (4-phenylisocyanate), 25.5 parts of poly (tetramethyleneoxide) glycol of a molecular weight of 3408 are added. After completion of the addition, the reaction mixture is stirred for one hour at 90–95° C. to yield a prepolymer having isocyanate groups at its ends. This prepolymer is cooled to room temperature, following which it is dissolved in N,N-dimethylformamide by adding 80 parts of the latter with vigorous stirring. The so obtained solution is cooled to 0° C., after which 0.667 part of aminoacetic acid hydrazide dissolved in 40 parts of N,N-dimethylformamide is added thereto with vigorous stirring. The colorless, transparent polymer solution obtained after stirring the reaction mixture for about one hour at room temperature has a viscosity of about 220 poises (20° C.). After deaeration of the polymer solution, it is spun by extruding from a spinneret into a water bath. The filament is then dried for 3 hours at 80° C. under reduced pressure while still wound on a reel. The so obtained filament has the following properties:

Tenacity, g./de. _____ 0.97
Elongation, percent _____ 1080
Tensile recovery (200%, room temperature), percent _____ 97
Stress relaxation (50%, 1 min.), percent _____ 7.5
200% modulus under dry heat (140° C.), g./de. _____ 0.056
Recovery under dry heat (200%, 140° C.), percent _____ 75

EXAMPLE 2

A solution of 2.47 parts of methylene bis (4-phenylisocyanate) in 20 parts of benzene is added in a stream of nitrogen to 7.41 parts of poly (tetramethyleneoxide) glycol having a molecular weight of 1500. After distilling off the benzene from the reaction mixture, it is stirred for one hour at 90–95° C. To a prepolymer obtained in this manner 20 parts of N,N-dimethylformamide are added, and the prepolymer is dissolved with vigorous stirring. After cooling this solution to 0° C., 0.508 part of β-aminopropionic acid hydrazide in 20 parts of N,N-dimethylformamide is added followed by washing the adding funnel with 5 parts of N,N-dimethylformamide. The colorless, transparent polymer solution obtained after stirring the solution for about one hour at room temperature is deaerated and then spun and dried as in Example 1. The so obtained filament has the properties shown in Table III. By way of comparison, this experiment is repeated except that 0.296 part of ethylenediamine is used instead of the β-aminopropionic acid hydrazide. The properties of the filament so obtained is also shown in Table III.

TABLE III

| | Example 2 | Comparison |
|---|---|---|
| Tenacity, g./de. | 1.06 | 0.72 |
| Elongation, percent | 870 | 780 |
| 100% Modulus, g./de. | 0.078 | 0.065 |
| Tensile recovery (200%, room temperature), percent | 96 | 93 |
| Recovery under wet heat (100%, 10 min., 90° C.), percent | 83 | 68 |
| Carbon arc Fade-O-Meter: | | |
| (55° C., 20 hrs., tenacity retained after radiation), percent | 31 | (¹) |
| (55° C., 20 hrs., elongation retained after radiation), percent | 63.7 | (¹) |

¹ Not measurable.

EXAMPLE 3

After heating and melting 3.74 parts of methylene bis (4-phenylisocyanate), 15 parts of poly (tetramethyleneoxide) glycol having a molecular weight of 2004 are added dropwise thereto under a stream of nitrogen. After completion of the dropping, the mixture is stirred for one hour at 90–95° C., followed by cooling to 20° C. and addition of 40 parts of N,N-dimethylacetamide to dissolve the mixture. This prepolymer solution is cooled to 0° C., following which a mixture consisting of 40 parts of N,N-dimethylacetamide in which have been dissolved 0.634 part of aminoacetic acid hydrazide and 0.03 part of acetic acid hydrazide as a viscosity adjusting agent is added with vigorous stirring. The so obtained colorless, transparent polymer solution is heated to 100° C., extruded from a spinneret having 8 holes each 0.1 mm. in diameter, then passed through a tower maintained at a temperature of 200–220° C. and wound up at the rate of 100 meters per minute, thereby obtaining filaments having the properties shown in Table IV, below.

By way of comparison, an experiment is carried out following the procedures described hereinabove except that instead of the aminoacetic acid hydrazide 0.648 part of carbohydrazide is used, which is added after dissolving in N,N-dimethylacetamide by heating to 120° C. followed by cooling to 70° C. The results thereof are also shown in Table IV.

TABLE IV

| Example | Tenacity, g./de. | Elongation, Percent | 100% Modulus, g./de. | Tensile Recovery (200%, room temp.), Percent | Tensile Recovery Under Wet Heat (100%, 10 min, 90° C.), Percent | Stress Relaxation (200%, 1 min., room temp.), Percent |
|---|---|---|---|---|---|---|
| 3 | 1.07 | 840 | 0.076 | 96 | 84 | 31 |
| Comparison | 0.93 | 790 | 0.073 | 93.8 | 70 | 35.3 |

EXAMPLE 4

A filament obtained by following the procedures described in Example 1 except that as the poly(tetramethyleneoxide) glycol one having a molecular weight of 2500 is used is treated for 6 hours with dry heat at 120° C., with the consequence that it has the properties shown in Table V below.

Table V

| | |
|---|---|
| Tenacity, g./de. | 1.1 |
| Elongation, percent | 890 |
| Tensile recovery (200%, room temperature), percent | 97 |
| 200% modulus under dry heat (140° C.), g./de. | 0.091 |
| Recovery under dry heat (200%, 140° C.), percent | 85 |

EXAMPLE 5

146 parts of adipic acid, 87 parts of ethyleneglycol and 30 parts of 1,2-propylene glycol are heated for 3 hours at 130–170° C. followed by heating under a pressure of 7–9 mm. Hg to obtain a polyester having acid and hydroxyl values of 0.23 and 65.7, respectively. Dissolving 34.2 parts of this polyester in 54 parts of benzene, then adding 10 parts of methylenebis(4-phenylisocyanate), this mixture is refluxed above a steam bath for about one hour with stirring. After distilling the benzene off, the mixture is cooled to room temperature, after which 72 parts of N,N-dimethylformamide are added and the mixture is dissolved therein with vigorous stirring. To the so obtained prepolymer, after having been cooled to 0° C., are added 2.16 parts of β-aminopropionic acid hydrazide dissolved in 70 parts of N,N-dimethylformamide with vigorous stirring. The viscosity of the so obtained 25% polymer solution was 500 poises (20° C.). A 50% dimethylformamide suspension of titanium dioxide is added such as to become 5%, based on the polymer, followed by thorough stirring and thereafter spinning of the solution by extrusion into a 60° C. water bath. The filament obtained after a dry heat treatment for 3 hours at 120° C. has the properties shown in Table VI, below.

Table VI

| | |
|---|---|
| Tenacity, g./de. | 0.75 |
| Elongation, percent | 770 |
| 100% modulus, g./de. | 0.067 |
| Tensile recovery (200%, room temp.), percent | 95.5 |
| Stress relaxation (200%, 1 min.), percent | 31.7 |

Further, when the foregoing polymer solution is poured onto a glass plate and the solution is evaporated at about 100° C., highly elastic film of high tenacity having a nontacky surface can be obtained.

We claim:

1. A process for preparing highly elastic linear polymer which comprises reacting in an inert solvent (a) at least one linear prepolymer of a molecular weight of at least 700 having isocyanate groups at its two ends said linear prepolymer being obtained by the reaction in a single step of one or more linear high molecular weight substances selected from polyglycols, polydiamines, polydihydrazides, polyaminoalcohols, polyhydroxyhydrazides and polyaminohydrazides with a molar excess of one or more organic diisocyanates and a molecular weight of at least 700 with (b) an aminohydrazide of a molecular weight of not more than 140 and having as one of its end groups a primary amino group and as its other a —CONHNH$_2$ group.

2. The process according to claim 1 wherein said aminohydrazide has a molecular weight of not more than 115.

3. The process according to claim 1 wherein said aminohydrazide is at least one member selected from the group consisting of aminoacetic acid hydrazide and β-aminopropionic acid hydrazide.

4. The process according to claim 1 wherein said diisocyanates are symmetrical aromatic diisocyanates.

5. The process according to claim 1 wherein said linear high molecular weight substances are polyglycols.

6. The process according to claim 5 wherein said polyglycols have a molecular weight of 500 to 4000.

7. The process according to claim 5 wherein said polyglycols are at least one member selected from the group consisting of polyoxyalkyleneglycols and polyesterglycols.

8. The process according to claim 1 wherein said inert solvent is a member selected from the group consisting of N,N-dimethylformamide and N,N-dimethylacetamide.

9. An elastic article composed of an elastic linear polymer obtained by reacting in an inert solvent (a) at least one linear prepolymer of a molecular weight of at least 700 having isocyanate groups at its both ends said linear prepolymer being obtained by the reaction in a single step of one or more linear high molecular weight substances selected from polyglycols, polydiamines, polydihydrazides, polyaminoalcohols, polyhydroxyhydrazides and polyaminohydrazides with a molar excess of one or more organic diisocyanates and a molecular weight of at least 700 with (b) an aminohydrazide of a molecular weight of not more than 140 and having as one of its end groups a primary amino group and as its other a —CONHNH$_2$ group.

References Cited

UNITED STATES PATENTS

| 2,929,804 | 3/1960 | Steuber | 260—77.5 |
| 3,198,863 | 8/1965 | Lauer et al. | 264—184 |
| 3,305,533 | 2/1967 | Thoma et al. | 260—75 |
| 3,331,887 | 7/1967 | Wakasa et al. | 260—849 |

FOREIGN PATENTS

| 1,344,657 | 10/1963 | France. |

DONALD E. CZAJA, Primary Examiner

H. S. COCKERAM, Assistant Examiner

U.S. Cl. X.R.

260—77.5